US011524489B2

(12) United States Patent
Iwase et al.

(10) Patent No.: US 11,524,489 B2
(45) Date of Patent: Dec. 13, 2022

(54) FILM, ROLL AND ADHESIVE TAPE

(71) Applicant: YUPO CORPORATION, Tokyo (JP)

(72) Inventors: Yuichi Iwase, Ibaraki (JP); Takahiko Ueda, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 405 days.

(21) Appl. No.: 16/346,217

(22) PCT Filed: Oct. 31, 2017

(86) PCT No.: PCT/JP2017/039445
§ 371 (c)(1),
(2) Date: Apr. 30, 2019

(87) PCT Pub. No.: WO2018/084158
PCT Pub. Date: May 11, 2018

(65) Prior Publication Data
US 2019/0255823 A1 Aug. 22, 2019

(30) Foreign Application Priority Data

Nov. 2, 2016 (JP) .............................. JP2016-215178

(51) Int. Cl.
*B32B 27/08* (2006.01)
*C09J 7/24* (2018.01)
(Continued)

(52) U.S. Cl.
CPC .............. *B32B 27/08* (2013.01); *B32B 27/00* (2013.01); *B32B 27/20* (2013.01); *B32B 27/32* (2013.01);
(Continued)

(58) Field of Classification Search
CPC .......... B32B 2250/24; B32B 2307/706; B32B 2323/10; B32B 2307/516; B32B 27/20;
(Continued)

(56) References Cited

U.S. PATENT DOCUMENTS 6,649,682 B1 * 11/2003 Breton ..................... C09D 7/61
524/404
10,717,223 B2  7/2020 Iwase et al.
(Continued)

FOREIGN PATENT DOCUMENTS

EP 3778032 A1 *  2/2021 ............. B32B 27/32
JP 61-167551 A  7/1986
(Continued)

OTHER PUBLICATIONS

Machine translation of JP 2009/248407 A (Year: 2009).*
(Continued)

*Primary Examiner* — Scott R. Walshon
(74) *Attorney, Agent, or Firm* — Greenblum & Bernstein, P.L.C.

(57) ABSTRACT

A film that is excellent in easy cuttability and linear cuttability and suppressed in breakability in processing, and a roll and a pressure-sensitive adhesive tape that includes the film. The film has the tensile strength in one direction is 1.1 to 2.5 kN/m and the tensile strength in a direction orthogonal to the one direction is 3.0 to 10 kN/m, or the tensile strain at tensile strength in one direction is 50 to 150% and the tensile strain at tensile strength in a direction orthogonal to the one direction is 8 to 20%.

16 Claims, 1 Drawing Sheet

(51) Int. Cl.
*C09J 7/38* (2018.01)
*B32B 27/20* (2006.01)
*B32B 27/32* (2006.01)
*B32B 37/15* (2006.01)
*B32B 38/00* (2006.01)
*B32B 27/00* (2006.01)
*C09J 7/20* (2018.01)
*C08J 5/18* (2006.01)

(52) U.S. Cl.
CPC ........ *B32B 37/153* (2013.01); *B32B 38/0012* (2013.01); *C08J 5/18* (2013.01); *C09J 7/20* (2018.01); *C09J 7/243* (2018.01); *C09J 7/385* (2018.01); *B32B 2038/0028* (2013.01); *B32B 2264/107* (2013.01); *B32B 2307/516* (2013.01); *B32B 2307/518* (2013.01); *B32B 2323/10* (2013.01); *B32B 2405/00* (2013.01); *C09J 2423/106* (2013.01); *C09J 2433/00* (2013.01)

(58) Field of Classification Search
CPC . B32B 27/08; C09J 2433/00; C09J 2423/106; C09J 7/243; C09J 7/20
See application file for complete search history.

(56) References Cited

U.S. PATENT DOCUMENTS

| 2005/0031822 A1* | 2/2005 | Aihara | B32B 27/08 428/40.1 |
| 2011/0179997 A1* | 7/2011 | Hayata | C09J 7/243 118/505 |

FOREIGN PATENT DOCUMENTS

| JP | 61-195837 A | 8/1986 |
| JP | 62-53389 A | 3/1987 |
| JP | 2-78525 A | 3/1990 |
| JP | 2005-96079 A | 4/2005 |
| JP | 2005-131952 A | 5/2005 |
| JP | 2006-248066 A | 9/2006 |
| JP | 2007-83580 A | 4/2007 |
| JP | 2009-248407 A | 10/2009 |
| WO | 2016/133012 | 8/2016 |

OTHER PUBLICATIONS

International Search Report issued in PCT/JP2017/039445, dated Feb. 6, 2018.
China Official Action issued in Chinese Application No. 201780067162.9, dated Feb. 4, 2021, and English language translation thereof.

* cited by examiner

FILM, ROLL AND ADHESIVE TAPE

TECHNICAL FIELD

The present invention relates to a film excellent in easy cuttability and linear cuttability and suppressed in breakability in processing, and a roll and a pressure-sensitive adhesive tape having the film.

BACKGROUND ART

As films excellent in easy cuttability, films having a weak portion to become a starting point of cutting are conventionally proposed. Films excellent in easy cuttability, since being used in tape forms in many cases, are demanded to be easily cut in the width direction of the films. Here, examples of methods of imparting the weak portion in film production include a method of providing cavities on the surface of or in the inside of a film, a method of imparting irregularities to the surface of a film by using an embossed roller, and a method in which two or more materials incompatible with one another are mixed to easily cause interfacial peeling. Further, methods of subjecting a film to a later processing after production include ones providing sewing machine perforations, a small holes array, and a slit.

On the other hand, methods of making films excellent in linear cuttability include: a method of providing surface irregularities having an anisotropic shape; a method of providing surface irregularities having no anisotropy in shape but anisotropy in array; a method of providing a porous uniaxially stretched layer; a method of arranging cavities in the width direction; and additionally in a laminated film having a porous polypropylene layer (A) and a uniaxially oriented polypropylene layer (B), a method in which the lamination ratio of the layer (A) to the layer (B) is made to be 20:50 to 20:5 (for example, see Patent Literature 1).

Further for the purpose of making a film to develop hand cuttability in both directions of longitudinal direction and width direction of the film, for a three-layer laminate of polypropylene, there is included a method in which a middle layer is made of a uniaxially stretched layer containing a petroleum resin, one surface layer is made of a uniaxially stretched layer and the other surface layer is made of a biaxially stretched layer, and at least one surface layer is blended with an inorganic filler (For example, see Patent Literature 2).

CITATION LIST

Patent Literature

Patent Literature 1: Japanese Patent Laid-open No. 2007-83580
Patent Literature 2: Japanese Patent Laid-open No. 61-195837

SUMMARY OF INVENTION

Technical Problem

However, although the method described in Patent Literature 1 has mechanisms for developing easy cuttability by making the layer (A) of a porous layer and for developing linear cuttability in the width direction by making the layer (B) of a transversely uniaxially stretched layer, the method does not success to develop linear cuttability by hand cutting in the state of not being notched.

In consideration of the above situation, the present invention has an object to provide a film which can easily be cut by hand when being made into a tape form, and has linear cuttability, and is unlikely to be broken in a production step. That is, the technical problem to be solved by the present invention is to provide a film excellent is easy cuttability and linear cuttability, and suppressed in breakability in processing, and a roll and a pressure-sensitive adhesive tape having the film.

Solution to Problem

As a result of approaches to various physical properties regarding breakage of films, the present inventors have found that by making the anisotropy of the tensile strength or the anisotropy of the tensile strain at strength as measured according to JIS K7161-1 to be in specific ranges, the above problem can be solved, and in a film containing a uniaxially stretched layer, by making the composition of the uniaxially stretched layer and the proportion in terms of mass of the uniaxially stretched layer in the film to be specified, the physical properties in the above specific ranges can be attained, and this finding has led to the creation of the present invention.

That is, the present invention and preferred aspects thereof, which is the solution to the above problem, are as follows.

[1] A film, having a tensile strength in one direction of 1.1 to 2.5 kN/m as measured at a tensile rate of 100 mm/min according to JIS K7161-1, and
having a tensile strength in a direction orthogonal to the one direction of 3.0 to 10 kN/m as measured at a tensile rate of 100 mm/min according to JIS K7161-1.

[2] A film, having a tensile strain at strength in one direction of 30 to 150% as measured at a tensile rate of 100 mm/min according to JIS K7161-1, and
having a tensile strain at strength in a direction orthogonal to the one direction of 8 to 20% as measured at a tensile rate of 100 mm/min according to JIS K7161-1.

[3] The film according to [1] or [2], wherein
the film has a uniaxially stretched layer, and
a unstretched layer or a biaxially stretched layer;
the uniaxially stretched layer comprises 30 to 80% by mass of a thermoplastic resin and 20 to 70% by mass of an inorganic fine powder or an organic filler; and
the mass occupancy of the uniaxially stretched layer is 0.55 to 0.95 as determined by dividing a basis weight of the uniaxially stretched layer by a basis weight of all film layers.

[4] The film according to [3], wherein
the film is a laminate having three or more layers; and
either of the outermost surface layers on both surfaces of the film is the uniaxially stretched layer.

[5] A roll having a film according to any one of [1] to [4], wherein the one direction in the film is the longitudinal direction.

[6] A pressure-sensitive adhesive tape having a film according to any one of [1] to [4], wherein the adhesive tape has a pressure-sensitive adhesive layer on at least one surface of the film.

Advantageous Effects of Invention

According to the present invention, a film excellent in easy cuttability and linear cuttability and suppressed in breakability in processing, and a roll and a pressure-sensitive adhesive tape having the film can be provided.

DESCRIPTION OF EMBODIMENTS

Figure 1:
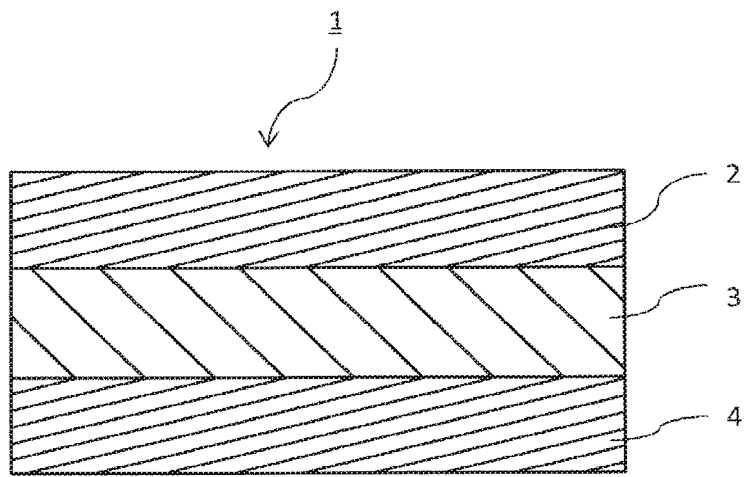
FIG. 1 is a schematic view of an example of the film according to the present invention.

Hereinafter, the present invention will be described in detail. Interpretations of constituent features described below are often made based on typical embodiments according to the present invention, but the present invention is not limited to such embodiments.

In the present description, the numerical range represented by using "to" means a range including numerical values described before and after the "to" as the lower limit value and the upper limit value, respectively.

In the present invention, when the term "main component" or "major" is used, a main component in copolymerization refers to a component used in the largest molar amount out of copolymerizing monomers, and a main component in a composition refers to a material used in the largest mass out of materials blended; and a major thermoplastic resin refers to a thermoplastic resin used in the largest mass out of thermoplastic resins blended.

In the present description, MD (Machine Direction) refers to the flowing direction in film forming machines and processing machines, that is, the longitudinal direction of a film; and CD (Transverse Direction) refers to the direction orthogonal to the MD, that is, the width direction of the film.

[Film]

A first aspect of the film according to the present invention is a film having a tensile strength in one direction of 1.1 to 2.5 kN/m as measured at a tensile rate of 100 mm/man according to JIS K7161-1, and having a tensile strength in a direction orthogonal to the one direction of 3.0 to 10 kN/m as measured at a tensile rate of 100 mm/min according to JIS K7161-1.

A second aspect of the film according to the present invention is a film having a tensile strain at strength in one direction of 50 to 150% as measured at a tensile rate of 100 mm/min according to JIS K7161-1, and having a tensile strain at strength in a direction orthogonal to the one direction of 8 to 20% as measured at a tensile rate of 100 mm/min according to JIS K7161-1.

Preferably, the film of the first or second aspect according to the present invention has a uniaxially stretched layer, and an unstretched layer or a biaxially stretched layer, wherein the uniaxially stretched layer contains 30 to 80% by mass of a thermoplastic resin and 20 to 70% by mass of an inorganic fine powder or an organic filler; and the mass occupancy of the uniaxially stretched layer is 0.55 to 0.95 as determined by dividing a basis weight (grammage) of the uniaxially stretched layer by a basis weight of all film layers. Such a film can attain the tensile strength of the first aspect and also the tensile strain at strength of the second aspect.

According to either constitution of the first aspect and the second aspect of the film according to the present invention, a film excellent in easy cuttability and linear cuttability and suppressed in breakability in processing can be provided.

Hereinafter, preferred aspects of the first aspect and the second aspect of the film according to the present invention will be described.

<Tensile Strength>

In the first aspect of the film according to the present invention, the film is designed such that by making the tensile strength in one direction to be significantly lower than the tensile strength is a direction orthogonal to the one direction, the film is easily broken on application of a tensile force in the one direction. When the tensile strength in one direction is equal to or higher than the lower limit value in the above range, the film tends to be unlikely to be broken in film production. On the other hand, when the tensile strength in one direction is equal to or lower than the upper limit value in the above range, the cuttability (easy cuttability) in the state of not being notched becomes good.

Further when the tensile strength in a direction orthogonal to the one direction is equal to or higher than the lower limit value in the above range, the linear cuttability tends to become good. On the other hand, when the tensile strength in a direction orthogonal to the one direction is equal to or over than the upper limit value in the above range, the force required in cutting tends to become low while the linear cuttability is developed.

Also in the second aspect of the film according to the present invention, preferably, the tensile strength in tension in one direction at a tensile rate of 100 mm/min according to JIS K7161-1 is 1.1 to 2.5 kN/m, and the tensile strength in tension in a direction orthogonal to the one direction at a tensile rate of 100 mm/min according to JIS K7161-1 is 3.0 to 10 kN/m.

The tensile strength in the one direction is more preferably 1.4 to 2.1 kN/m. On the other hand, the tensile strength in a direction orthogonal to the one direction is more preferably 5.0 to 8.5 kN/m.

Further from the viewpoint of film breakage prevention when a tensile force is applied to the film by machines having rollers, such as a film producing machine and a film coating machine, the tensile strength in MD of the film is preferably 1.0 kN/m or higher, more preferably 1.3 kN/m or higher and still more preferably 2.0 kN/m or higher.

Here, if the above "one direction" is nearly equivalent to the longitudinal direction of the film, when the film is made into a tape form, breaking points propagate in CD of the tape-form film and as a result, the tape can be cut in the width direction by hand.

Further if the above "one direction" is nearly orthogonal to the longitudinal direction of the film, when the film is made into a tape form, breaking points propagate in MD of the tape-form film and as a result, becomes easy to tear the tape by hand.

<Tensile Strain at Strength>

In the second aspect of the film according to the present invention, the film is designed such that by making the tensile strain at strength in one direction to be significantly higher than the tensile strain at strength in a direction orthogonal to the one direction, the breakage due to a tensile force applied in the one direction in forming the film or in a step of imparting tackiness to the film is suppressed, but when a tearing force is applied in a direction orthogonal to the one direction, the film is easily broken. When the tensile strain at strength in the one direction is equal to or higher than the lower limit value in the above range, the linear cuttability is good and the film tends to be unlikely to be broken due to a tensile force applied in the one direction in forming the film or in a step of imparting tackiness to the film. On the other hand, when the tensile strain at strength in the one direction is equal to or lower than the upper limit value in the above range, it becomes easy for breaking points to propagate in a direction orthogonal to the one direction and the easy cuttability tends to become good.

Further when the tensile strain at strength in a direction orthogonal to the one direction is equal to or higher than the lower limit value in the above range, the breakage of the is unlikely to occur due to a tensile force applied in the one direction in forming the film or in a step of imparting tackiness to the film. On the other hand, when the tensile strain at strength in a direction orthogonal to the one direction is equal to or lower than the upper limit value in the above range, the easy cuttability and the linear cuttability are likely to become good.

Also in the first aspect of the film according to the present invention, preferably, the tensile strain at strength in tension in one direction is 50 to 150% as measured at a tensile rate of 100 mm/min according to JIS K7161-1, and the tensile strain at strength in tension in a direction orthogonal to the one direction is 8 to 20% as measured at a tensile rate of 100 mm/min according to JIS K7161-1.

The tensile strain at strength in the one direction is more preferably 55 to 120% and still more preferably 60 to 105%. On the other hand, the tensile strain at strength in a direction orthogonal to the one direction is more preferably 9 to 18%.

Then, a value as an index of anisotropy of the tensile strain at strength, obtained by dividing the tensile strain at strength in one direction by the tensile strain at strength is a direction orthogonal to the one direction, is preferably 3.5 to 10.0, more preferably 5.0 to 9.0 and still more preferably 5.5 to 7.2.

Here, if the above "one direction" is nearly equivalent to the longitudinal direction of the film, when the film is made into a tape form, the tape can be cut in the width direction thereof by hand.

Further if the above "one direction" is nearly orthogonal to the longitudinal direction of the film, a tape which can easily be torn by hand is obtained.

<Mass Occupancy of the Uniaxially Stretched Layer>

As described above, preferably, the film of the first aspect and second aspect according to the present invention has the uniaxially stretched layer, and the unstretched layer or the biaxially stretched layer, wherein the uniaxially stretched layer contains 30 to 80% by mass of a thermoplastic resin and 20 to 70% by mass of an inorganic fine powder; and the mass occupancy of the uniaxially stretched layer is 0.55 to 0.95 as determined by dividing a basis weight of the uniaxially stretched layer by a basis weight of all film layers.

The mass occupancy (no unit) of the uniaxially stretched layer is a value ($B_1/B_T$) determined by dividing a basis weight ($B_1$) of the uniaxially stretched layer by a basis weight ($B_T$) of all film layers. When the film according to the present invention has a plurality of uniaxially stretched layers having the same stretch direction, the sum of basis weights thereof is regarded as the basis weight of the uniaxially stretched layers. Further when the film according to the present invention has a longitudinally uniaxially stretched layer and a transversely uniaxially stretched layer, the difference between a larger basis weight and a smaller basis weight is regarded as the basis weight of the uniaxially stretched layers and the stretch direction of the stretched layer having the larger basis weight is regarded as the stretch direction of the uniaxially stretched layers.

The uniaxially stretched layer containing the thermoplastic resin has the effect of imparting anisotropy to the tensile strength and the tensile strain at strength of the film containing the uniaxially stretched layer; and the tensile strength in the stretch direction of the uniaxially stretched layer tends to be high relatively to that in a direction orthogonal to the stretch direction, and the tensile strain at strength tends to be low relatively. When the mass occupancy of the uniaxially stretched layer is equal to or higher than the lower limit value in the above range, the easy cuttability and the linear cuttability become good. Particularly in the present invention, by making the occupancy in terms of mass of the uniaxially stretched layer to be high, the easy cuttability and additionally the linear cuttability become good. On the other hand, when the mass occupancy of the uniaxially stretched layer is equal to or lower than the upper limit value in the above range, the film tends to be unlikely to be broken due to a tensile force applied in one direction in forming the film or in a step of imparting tackiness to the film.

Here, the uniaxially stretched layer refers to a layer which has been stretched two or more times in one direction and has not been stretched in a direction orthogonal to the one direction or, even when having been stretched, has been stretched at a stretch ratio of 1.5 or less.

On the other hand, the unstretched layer or the biaxially stretched layer has the effect of imparting isotropy to the tensile strength and the tensile strain at strength of a film containing the unstretched layer or the biaxially stretched layer. Since as compared with the biaxially stretched layer, the unstretched layer tends to be low in the tensile strength and high in the tensile strain at strength, by the selection of the unstretched layer or the biaxially stretched layer and the regulation of the thickness of each layer and the like, variations in embodiments are produced.

Here, the biaxially stretched layer refers to a layer which has been stretched two or more times in one direction and in a direction orthogonal to the one direction, respectively. The unstretched layer refers to a layer which has not been stretched in either direction or, when having been stretched, has been stretched at a stretch ratio of 1.5 or less.

For example, if the stretch direction of the uniaxially stretched layer is nearly equivalent to the longitudinal direction of the film, a tape which can easily be torn is obtained.

If the stretch direction of the uniaxially stretched layer is nearly orthogonal to the longitudinal direction of the film, when the film is made into a tape form, the tape can be cut in the width direction by hand.

The mass occupancy of the uniaxially stretched layer is more preferably in the range of 0.62 to 0.90 and particularly preferably in the range of 0.65 to 0.85.

<Content Rates of the Thermoplastic Resin and the Inorganic Fine Powder or the Organic Filler of the Uniaxially Stretched Layer>

The tensile strength and the tensile strain at strength of the uniaxially stretched layer can suitably be set by adjusting the composition of the uniaxially stretched layer, particularly content rates of the thermoplastic resin and the inorganic fine powder.

The content rate of the thermoplastic resin of the uniaxially stretched layer is preferably 30 to 80% by Mass and more preferably 35 to 60% by mass. When the content rate of the thermoplastic resin is equal to or higher than the lower limit value in the above range, the tensile strength and the tensile strain at strength increase; it becomes easy for the easy cuttability to be developed; and the formability and the breakability in processing become good. Further the inorganic fine powder or the organic filler tends to be unlikely to come off to become paper dusts. When the content rate of the thermoplastic resin is equal to or lower than the upper limit value in the above range, the likeliness is reversed. Particularly by making the content rate of the thermoplastic resin to be equal to or lower than the upper limit value in the above range, the film can be hardly elongated in cutting (the tensile strain at strength can be made low), and the easy cuttability becomes good.

On the other hand, the content rate of the inorganic fine powder or the organic filler in the uniaxially stretched layer is preferably 20 to 70% by mass and more preferably 40 to 65% by mass. When the content rate of the inorganic fine powder or the organic filler in the uniaxially stretched layer is equal to or higher than the lower limit value in the above range, if the stretch condition is set such that many pores are produced in stretching, the tensile strength does not become too high and it tends to become easy for the easy cuttability to be developed. Then if the stretch condition is set such that almost no pores are produced in stretching, the tensile strain at strength does not become too high and it tends to become easy for the easy cuttability to be developed. On the other hand, when the content rate of the inorganic fine powder or the organic filler in the uniaxially stretched layer is equal to or lower than the upper limit value in the above range, since a tensile strength necessary for formability can be obtained, the formability becomes good and the breakage of the film tends to be unlikely to occur in film formation or film processing.

The film of a preferred aspect according to the present invention may be a laminate of two layers only of the uniaxially stretched layer and the unstretched layer or the biaxially stretched layer, but may be a laminate of three or more layers which further has other layers, as long as having at least these two layers.

When the film according to the present invention is a laminate having two or more layers, the content rate of the thermoplastic resin of the uniaxially stretched layer is preferably lower than the content rate of thermoplastic resins of the other layers (for example, a biaxially stretched layer and an unstretched layer).

When the film according to the present invention is a laminate having two or more layers, the content rate of the inorganic fine powder or the organic filler of the uniaxially stretched layer is preferably higher than the content rate of inorganic fine powders or organic fillers of the other layers (for example, a biaxially stretched layer and an unstretched layer).

<Thickness>

Since the film according to the present invention is suitable as pressure-sensitive adhesive labels and pressure-sensitive adhesive tapes, the total film thickness is preferably 40 to 200 μm and more preferably 60 to 150 μm. When the film according to the present invention is used for packing tapes, curing tapes and the like, the thickness can be made to be 50 to 70 μm, and is preferably made to be 60 to 70 μm. When the film according to the present invention is used for pressure-sensitive adhesive labels such as food-package binding tapes, the thickness can be made to be 80 to 100 μm, and is preferably made to be 80 to 10 μm. Preferable ranges of the thicknesses of each layer when the film according to the present invention is the laminate will be described in a first embodiment and a second embodiment described later.

<Basis Weight and Density>

In the film according to the present invention, the basis weight (grammage) and the density are not particularly limited. When the film according to the present invention is the laminate, the basis weight of each layer is preferably designed such that the basis weight of the uniaxially stretched layer is maximized, whereas the density of the each layer is not particularly limited.

For example, from the viewpoint of the easy cuttability, a lower basis weight of all film layers is preferable. The basis weight of all film layers is preferably 5 to 150 g/m² and more preferably 20 to 100 g/m².

The basis weight of each layer of the film can be determined by the following procedure.

1) The total thickness of the film is measured by a thickness meter according to JIS K7130: 1999; 2) the ratio of each layer is determined by using an image observed by a scanning electron microscope and the thickness of the each layer is determined by multiplying the ratio by the total thickness; and 3) the basis weight of the each layer is determined by taking, as corresponding volume fractions, areal occupancy of the pores, the thermoplastic resin, the inorganic fine powder, the organic filler and other substances observed in a cross section of a certain layer, calculating the product of the total sum obtained by multiplying each corresponding volume fraction by the density of each substance and the thickness of a certain layer, and taking the product as the basis weight. A specific example will be shown in Examples described later.

For example, the density of all film layers is preferably 0.4 to 1.2 g/cm³ and more preferably 0.6 to 1.0 g/cm³. The density of the film may be regulated by the composition of the film, or may be regulated by production steps such as stretching. The density of the film is preferably regulated by stretching the layer containing the inorganic fine powder or the organic filler to make pores. The stretch ratio of each layer of the film is not particularly limited.

<Layer Constitution>

The film according to the present invention is preferably a laminate having two or more layers.

Figure 2:
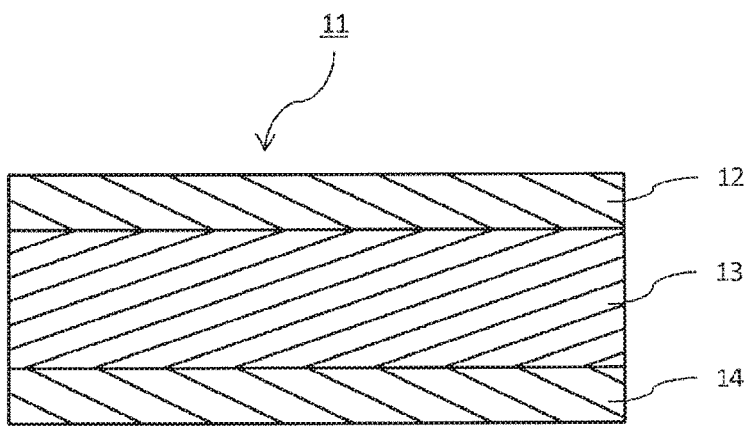
FIG. 2 is a schematic view of another example of the film according to the present invention.

FIG. 1 and FIG. 2 are each a schematic view showing one example of the film according to the present invention when the film is a laminate.

Hereinafter, with respect to the constitution of the film according to the present invention, preferred embodiments will be described specifically.

A First Embodiment

In a preferred first embodiment of the film according to the present invention, the film is a laminate having a core layer and a first laminated layer, wherein the core layer is the biaxially stretched layer or the unstretched layer; and the first laminated layer is the uniaxially stretched layer.

The thickness of the core layer is preferably 5 to 30 μm. When the thickness of the core layer is equal to or larger than the lower limit value in the above range, the film tends to be unlikely to be broken in film production and in processing of the obtained film. When the thickness of the core layer is equal to or smaller than the upper limit value in the above range, the linear cuttability tends to become good. From the viewpoint of imparting rigidity to improve easy handling of the film, the core layer is preferably the biaxially stretched layer.

From the viewpoint of improving the adhesive strength between the laminated layer and the core layer, or suppressing a defect (hereinafter, referred to also as die drool) of die slip fouling due to bleeding-out of the inorganic filler in forming the core layer, the core layer is preferably provided with a joining layer on its surface. The thickness of the joining layer is preferably 0.5 to 4 μm.

The first laminated layer is provided on one surface of the core layer. The thickness of the first laminated layer is preferably 15 to 40 μm.

The first laminated layer may have a joining layer on the surface on the side contacting with the core layer. The thickness of the joining layer is preferably 0.5 to 4 μm.

The first laminated layer may have a surface layer on the surface opposite to the side contacting with the core layer. The surface layer constitutes the outermost layer of the film and imparts functions of printability, improvement of close adhesion with a pressure-sensitive adhesive, prevention of falling-off of the inorganic filler, and the like to the film. The thickness of the surface layer is preferably 0.5 to 4 μm.

From the viewpoint of enhancing the easy cuttability and the linear cuttability, the film according to the first embodiment is preferably a laminate having three or more layers, wherein either of outermost surface layers on both surfaces of the film is the uniaxially stretched layer. That is, as described above, the film according to the first embodiment preferably has a second laminated layer being the uniaxially stretched layer on the surface of the core layer on the opposite side to the first laminated layer. By providing the second laminated layer, the effects of suppressing curling of the film, securing the adhesive strength in use of a pressure-sensitive adhesive film, suppressing paper dusts and the like can be obtained. The second laminated layer, by being made to have a constitution different from the first laminated layer, can develop functions different from the first laminated layer. Further, the second laminated layer, as in the first laminated layer, can be provided with a joining layer or a surface layer. At this time, the surface layer provided on the second laminated layer may have a constitution different from the surface layer provided on the first laminated layer.

FIG. 1 shows one example according to the first embodiment, in which a film 1 has a first laminated layer 2, a core layer 3 and a second laminated layer 4.

As shown in FIG. 1, the film 1 is a laminate having three layers, wherein outermost surface layers on both surfaces of the film 1 are the first laminated layer 2 and the second laminated layer 3, both of which is the uniaxially stretched layer.

(First Laminated Layer)

In the first embodiment, the first laminated layer is a layer developing anisotropy in properties regarding breakage. In order to simultaneously satisfy both the easy cuttability and the linear cuttability, preferably, the first laminated layer is the uniaxially stretched layer and the designing is made such that when a load is applied to the first laminated layer, breakage occurs without much elongation.

From the viewpoint of providing sufficient peelability and forming stability, the first laminated layer preferably contains the thermoplastic resin and at least one of the inorganic fine powder and the organic filler, and more preferably contains the thermoplastic resin and the inorganic fine powder. The thermoplastic resin, the inorganic fine powder and the organic filler, and various additives which can be contained as required will be described in the section of <Materials> described later.

The content of the thermoplastic resin in the first laminated layer is preferably 30 to 80% by mass, more preferably 35 to 70% by mass and still more preferably 40 to 60% by mass.

The content of the inorganic fine powder and the organic filler in the first laminated layer is preferably 20 to 70% by mass, more preferably 30 to 65% by mass and still more preferably 40 to 60% by mass. Here, the inorganic fine powder and the organic filler may be used singly or both together. In the case of using one of the inorganic floe powder and the organic filler, the content rate of either one may be in the above range; and in the case of using the both together, the total content rate may be in the above range. When the content of the inorganic fine powder is equal to or lower than the upper limit value in the above range, the tensile strength of the uniaxially stretched layer increases and the linear cuttability tends to become good. When being equal to or higher than the lower limit value in the above range, the tensile strength of the uniaxially stretched layer becomes high and the easy cuttability tends to become good.

Further the first laminated layer, as required, can be blended with various additives described later. The content rate of the additives is preferably 0 to 10% by mass.

The volume-average particle diameter of the inorganic fine powder is preferably 0.01 to 3 μm, more preferably 0.05 to 2.5 μm and still more preferably 0.1 to 1.5 μm. Here, the volume-average particle diameter refers to a median diameter corresponding to a cumulation of 50% in a particle size distribution in terms of volume as measured by a laser diffraction method based on JIS Z8825-1: 2001.

The average dispersed particle diameter of the organic filler is preferably 0.01 to 3 μm, more preferably 0.05 to 2.5 μm and still more preferably 0.1 to 1.5 μm. Here, the "average dispersed particle diameter" of the organic filler refers to an average dispersed particle diameter obtained by determining primary particle diameters of 20 neighboring particles of the organic filler in a region in a cross-sectional image of a layer observed by a scanning electron microscope (SEM), and averaging the primary particle diameters of the 20 particles.

From the viewpoint of easily regulating the mass occupancy of the uniaxially stretched layer at 0.55 to 0.95, the thickness of the first laminated layer is preferably 20 to 35 μm. When the thickness of the first laminated layer is equal to or larger than the lower limit value in the above range, the mass occupancy of the uniaxially stretched layer increases and simultaneously, the easy cuttability and the linear cuttability of the film tend to become good. When the thickness of the first laminated layer is equal to or smaller than the upper limit value in the above range, the mass occupancy of the uniaxially stretched layer decreases, and simultaneously, the breaking strength of the film increases, and thus the breakage of the film is unlikely to occur in forming the film.

From the viewpoint of the linear cuttability, the basis weight of the first laminated layer is preferably higher than that of the core layer. The basis weight of the first laminated layer is preferably 5 to 35 g/m$^2$ and more preferably 10 to 30 g/m$^2$.

The density of the first laminated layer is preferably 0.5 to 1.6 g/cm$^3$ and more preferably 0.6 to 1.4 g/cm$^3$.

The first laminated layer may be formed by a dry lamination method in which a material for the first laminated layer is formed into a film form and thereafter a material for the core layer is affixed, by using an adhesive or the like, on the film formed, or may be formed by an extrusion lamination method in which a material for the first laminated layer is extruded by an extruder and extruded as a film form through a T die or the like, and a material for the core layer in a half-melted state is laminated on the film formed and thereafter pressure bonded, cooled and the like.

The first laminated layer may have a single-layer structure, but may have a multilayer structure, in which two or more layers are laminated.

For example, the first laminated layer may have a joining layer on the surface on the side adhering with the core layer. A material to be used for the joining layer is not limited as long as having the effect of adhering the core layer and the uniaxially stretched layer, but preferable is a material which is activated by heat and is solidified by cooling, and preferable is a material which has a lower melting point than those of the uniaxially stretched layer and the core layer. Preferable are, for example, low-density polyethylene, linear low-density polyethylene, ethylene-propylene copolymers and ethylene-vinyl acetate copolymers. The thickness of the joining layer is preferably 0.5 to 4 μm.

Methods of providing the joining layer include a method in which a material for the uniaxially stretched layer and a material for the joining layer are co-extruded and laminated on the core layer made as a film, a method in which a material for the joining layer is applied on the core layer made as a film or the uniaxially stretched layer made as a film and dried as required, and then the counterpart film is pasted thereto, and a method in which a material for the joining layer is transferred with a pressure-sensitive adhesive layer and the counterpart film is pasted thereto.

The first laminated layer may have the surface layer on the surface opposite to the side adhering with the core layer. The functions the surface layer has include the printing ink fixing function, the writability, the antifouling property, the gloss and the coloration. The composition and the structure of the surface layer are suitably determined according to the objective functions. The thickness of the surface layer is preferably 0.5 to 4 μm.

(Core Layer)

In the first embodiment, the core layer is a layer to enhance mainly the breaking strength, suppress breakage of the film in production and later processing of the film, and develop various physical properties which do not need other anisotropy. The core layer is the unstretched layer or the biaxially stretched layer, and from the viewpoint of the easy, cuttability, the core layer is preferably designed so as to be capable of being broken; from the viewpoint of providing the forming stability, the core layer preferably contains the thermoplastic resin and at least one of the inorganic fine powder and the organic filler, and more preferably contains the thermoplastic resin and the inorganic fine powder. The thermoplastic resin, the inorganic fine powder and the organic filler, and various additives which can be contained as required will be described in the section of <Materials> described later.

The volume-average particle diameter of the inorganic fine powder is preferably 0.01 to 15 μm, more preferably 0.5 to 10 μm and still more preferably 1 to 5 μm.

When the core layer is the unstretched layer, the content of the thermoplastic resin is preferably 30 to 100% by mass, more preferably 35 to 100% by mass and still more preferably 50 to 100% by mass. Further the content of the inorganic fine powder and the organic filler is preferably 0 to 70% by mass, more preferably 30 to 65% by mass and still more preferably 40 to 50% by mass. Then the core layer may be blended as required with other additives described later. The content rate of the other additives is preferably 0 to 10% by mass.

In the core layer, as the thermoplastic resin, two or more resins incompatible with one another can be used in combination. Such a combination includes a combination of a polyethylene-based resin and a polypropylene-based resin and a combination of a polystyrene-based resin and a polypropylene-based resin.

When the core layer is the unstretched layer, when the content of the inorganic fine powder and the organic filler is 0% by mass or higher and lower than 30% by mass, since the core layer is unlikely to be broken, the thickness of the core layer is more preferably 5 to 15 μl. When the content of the inorganic fine powder and the organic filler is in the range of 30 to 60% by mass, since the core layer is easily broken, the thickness of the core layer is more preferably 10 to 30 μm. When the thickness of the core layer is equal to or larger than the lower limit value in the above range, the mass occupancy of the uniaxially stretched layer increases and simultaneously, the film tends to be unlikely to be broken in production and later processing of the film. Then when the thickness of the core layer is equal to or smaller than the upper limit value in the above range, since the mass occupancy of the uniaxially stretched layer reduces and simultaneously, anisotropy in physical properties regarding breakage becomes large, the linear cuttability becomes good.

When the core layer is the biaxially stretched layer, the content of the thermoplastic resin in the core layer is preferably 40 to 95% by mass, more preferably 50 to 90% by mass and still more preferably 60 to 80% by mass.

Further the content of the inorganic fine powder and the organic filler in the core layer preferably 5 to 60% by mass, more preferably 10 to 50% by mass and still more preferably 20 to 40% by mass.

The content of other additives which may be blended in the core layer is preferably 0 to 10% by mass When the core layer is the biaxially stretched layer, the thickness of the core layer is preferably 10 to 25 μm.

When the core layer is the biaxially stretched layer or the unstretched layer, from the viewpoint of the easy cuttability, it is better that the basis weight of the core layer is lower. The basis weight of the core layer is preferably 2 to 30 g/m$^2$ and more preferably 5 to 25 g/m$^2$.

A joining layer having adhesiveness with the first laminated layer and the second laminated layer can be provided on one surface or both surfaces of the core layer. The joining layer contains the thermoplastic resin and as required, can contain the inorganic fine powder, the organic filler, a peeling agent, a release agent, other various additives and the like.

The joining layer is preferably provided by a method in which when a thermoplastic resin composition for the core layer is extruded through a T die, a thermoplastic resin composition layer for the joining layer is laminated and coextruded in the T die.

Methods for producing the core layer and the first laminated layer in the first embodiment include a method in which an unstretched film or a biaxially stretched film for the core layer is formed of a thermoplastic resin composition for the core layer, and the first laminated layer having been uniaxially stretched is pasted and laminated thereon by the above dry lamination, and a method in which an unstretched film for the core layer is uniaxially stretched and an unstretched first laminated layer is laminated thereon by the above dry lamination or extrusion lamination, and thereafter, the laminate is uniaxially stretched in a direction orthogonal to the uniaxial stretch direction of the core layer. In the case or the latter case, from the viewpoint of the easy cuttability in the width direction of the tape, a method is preferable in which the core layer is longitudinally uniaxially stretched and thereafter, the laminate is transversely uniaxially stretched.

(Second Laminated Layer)]

In the first embodiment, the second laminated layer is preferably provided on the surface of the core layer where the first laminated layer is not provided.

The second laminated layer can be provided for the function to impart anisotropy is properties regarding the breaking strength, as in the first laminated layer. The second laminated layer is preferably a uniaxially stretched layer stretched in the same direction as in the first laminated layer. Preferable ranges of the composition, thickness, basis weight and density of the second laminated layer are the same as the preferable ranges of those of the first laminated layer.

Further the second laminated layer can also be provided for the purpose of suppressing curling due to provision of the first laminated layer. In this case, the second laminated layer may be an unstretched one, a uniaxially stretched one regardless of the stretch direction, or a biaxially stretched one.

Then, functions different from those of the first laminated layer can be imparted to the second laminated layer. For example, if the first laminated layer has the linear cuttability and the printing ink receptivity, a function to raise the adhesive strength with an adherend when the film is used as a pressure-sensitive adhesive tape and suppress paper dusts can be imparted to the second laminated layer.

Further, as in the first laminated layer, a joining layer having an adhesive function with the core layer and a surface layer to impart a specific function to the surface of the second laminated layer can be provided on the second laminated layer.

The second laminated layer can be provided by being laminated on the core layer by the similar method as in the first laminated layer, but may be provided. simultaneously with the first laminated layer or may be provided successively.

Second Embodiment

In a preferred second embodiment of the film according to the present invention, the film is a laminate having the core layer and the first laminated layer, wherein the core layer is the uniaxially stretched layer, and the first laminated layer is the biaxially stretched layer or the unstretched layer.

From the viewpoint of enhancing the easy cuttability and the linear cuttability, in the second embodiment, the film is preferably a laminate having a first laminated layer on a first surface of the core layer and a second laminated layer on a second surface of the core layer, wherein the core layer is the uniaxially stretched layer, and the first laminated layer is the biaxially stretched layer or the unstretched layer.

In the second embodiment, when the film is a laminate having the core layer being the uniaxially stretched layer, the first laminated layer being the biaxially stretched layer on a first surface of the core layer, and the uniaxially stretched layer on a second surface of the core layer, each uniaxially stretched layer contains preferably 20 to 70% by mass of the inorganic powder and more preferably 30 to 50% by mass thereof. Thereby, the film good in hand cuttability only in one direction, and good linear cuttability can be obtained.

(Core Layer)

In the second embodiment, the core layer is a layer to develop anisotropy in properties regarding breakage.

The thickness of the core layer is preferably 15 to 40 μm and more preferably 20 to 35 μm. When the thickness of the core layer is equal to or larger than the lower value in the above range, the mass occupancy of the uniaxially stretched layer increases and simultaneously, the easy cuttability and the linear cuttability of the film become good. When the thickness of the core layer is equal to or smaller than the upper limit value in the above range, the mass occupancy of the uniaxially stretched layer reduces and simultaneously, the breaking strength of the film increases and breakage tends to be unlikely to occur formation of the film.

A preferable range of the composition of the core layer in the second embodiment is the same as the preferable range of the composition of the first laminated layer in the first embodiment.

From the viewpoint of improving the adhesive strength of the laminated layer and the core layer and suppressing die drool in formation of the core layer, a joining layer is preferably provided on the surface of the core layer. The thickness of the joining layer is preferably 0 to 4 μm.

FIG. 2 shows one example of the film according to the second embodiment.

As shown in FIG. 2, a film 11 has a first laminated layer 12, a core layer 13 and a second laminated layer 14.

(The First Laminated Layer and the Second Laminated Layer)

The first laminated layer and the second laminated layer are layers to enhance mainly the breaking strength, suppress breakage in production and later processing of the film, and develop various physical properties which do not need other anisotropy.

Since in the first laminated layer and the second laminated layer, the tensile strength and the tensile strain at strength are preferably isotropic, the first laminated layer and the second laminated layer are preferably the unstretched layer or the biaxially stretched layer.

Preferable ranges of the compositions of the first laminated layer and the second laminated layer in the second embodiment are the same as the preferable range of the composition of the core layer in the first embodiment.

The thicknesses of the first laminated layer and the second laminated layer are each preferably 5 to 30 μm and more preferably 10 to 25 μm.

The first laminated layer may have a joining layer on the surface on the side contacting with the core layer. The thickness of the joining layer is preferably 0.5 to 4 μm.

The first laminated layer may have a surface layer on the surface opposite to the side contacting with the core layer. The surface layer constitutes the outermost layer of the film and imparts functions of printability, improvement of close adhesion with a pressure-sensitive adhesive, prevention of falling-off of the inorganic filler, and the like to the film. The thickness of the surface layer is preferably 0.5 to 4 μm.

The second laminated layer develops the effects of suppressing curling of the film, securing the adhesive strength in use of a pressure-sensitive adhesive film, suppressing paper dusts and the like. The second laminated layer, by being made to have a constitution different from the first laminated layer, can develop functions different from the first laminated layer. Further, the second laminated layer can be provided with a joining layer or a surface layer, as in the first laminated layer. At this time, the surface layer provided on the second laminated layer may have a constitution different from the surface layer provided on the first laminated layer.

<Materials>

Materials shown below are commonly used for the core layer, the first laminated layer and the second laminated layer.

(Thermoplastic Resin)

Examples of the thermoplastic resin include thermoplastic resins including polyolefins such as polypropylene, high-density polyethylene, medium-density polyethylene, low-density polyethylene and ethylene-cyclic olefin copolymers; polyamide reins such as nylon-6, nylon-6,6, nylon-6,10 and nylon-6,12; thermoplastic polyester resins such as polyethylene terephthalate and copolymers thereof, polyethylene naphthalate, aliphatic polyester and polylactic acid; polycarbonate resins; polystyrene resins such as atactic polystyrene and sydiotactic polystyrene; and polyphenylene sulfide. These may be used singly or as a mixture of two or more. Among these, polyolefin resins are preferably used. Further among the polyolefin resins, from the viewpoint of the costs, water resistance and chemical resistance, propylene-based resins and high-density polyethylene are more preferable.

As the propylene-based resins, propylene homopolymers having stereoregularity of isotactic, syndiotactic or in various degrees thereof, and copolymers made by polymerizing propylene as a main component of monomers with α-olefins such as ethylene, butene-1, hexene-1, heptene-1 and 4-methylpentene-1 can be used. The copolymers may be binary, ternary of quaternary, and may be random copolymers or block copolymers.

(Inorganic Fine Powder)

Examples of the inorganic fine powder include calcium carbonate, calcined clay, silica, diatomaceous earth, talc, titanium oxide, barium sulfate and alumina; and the one of them may be used singly or in combination of two or more.

(Organic Filler)

As the organic filler, a resin which is different in kind from the thermoplastic resin being the main component may be preferably selected. For example, when the thermoplastic resin being the main component is a polyolefinic resin, as the organic filler, polyethylene terephthalate, polybutylene terephthalate, polycarbonate, nylon-6, nylon-6,6, cyclic olefin homopolymers or copolymers of cyclic olefin and ethylene are preferably used. Further substances incompatible with the thermoplastic resin being the main component and having a melting point of 120° C. to 300° C. or a glass transition temperature of 120° C. to 280° C. can also be used as the organic filler.

Here, the "melting point" of the organic filler refers to a melting point measured by a differential scanning calorimeter (DSC) according to JIS K7121: 2012; and the "glass transition temperature" of the organic filler refers to a glass transition temperature measured by a differential scanning calorimeter (DSC) according to JIS K7121: 2012. The organic filler may be used singly or in combination of two or more.

The additives include various additives such as a light-resistant agent, an antioxidant, a heat-resistant agent, an ultraviolet absorbent, an antiseptic, a dye, a pH regulator and a defoaming agent. From the viewpoint of not inhibiting formability of each layer constituting the film, the amount of these additives added is preferably added in the range of 0 to 10% by mass.

(Joining Layer)

Any kind of material for the joining layer is used as long as the material is capable of joining each of the first laminated layer and the second laminated layer. Examples thereof include ethylene-vinyl acetate copolymers (EVA) and partially saponified substances thereof (EVOH), and urethane-based, polyethylene-based polyether-based and modified polyolefin-based substances.

The use form of the material for the joining layer includes forms using a solvent, no solvent, an emulsion or a heat seal.

<Formation>

A forming method, a laminating method and a stretching method of the film to be used in each step can be carried out by using well-known various elemental technologies singly or in combination thereof, and are not particularly limited.

As the forming technology of the film, for example, casting in which a resin composition in a molten state is extruded in a sheet form through a single-layer or multilayer T die, T die or the like connected to a screw-type extruder, calendaring, roll forming, inflation or the like.

The film to be formed at this time may have a single layer structure or a multilayer structure of two or more-layer structure. For example, multilayering of the core layer enables improvement in mechanical characteristics and addition of various functions such as writability, scratch resistance and secondary processing suitability.

The laminating technology of the film includes lamination methods such as dry lamination method using various adhesives, wet lamination method and melt lamination method, multilayer die method (coextrusion systems) using a feed block and a multi-manifold, extrusion lamination method using a plurality of dies and coating methods using various coaters. Further a multilayer die and an extrusion lamination can also be used in combination.

As the uniaxial stretch technology, a between-rollers longitudinal stretch method utilizing the difference in circumferential speed of rollers, and a transverse stretch method utilizing a tenter oven can be used. The uniaxially stretched layer is preferably formed by being stretched 2 to 15 times, and is more preferably formed by being stretched 3 to 12 times.

As the biaxial stretch technology, a successive biaxial stretch method in a combination of between-rollers longitudinal stretch method utilizing the difference in circumferential speed of rollers and a transverse stretch method utilizing a tenter oven, a simultaneous biaxial stretch method using a combination of a tenter oven and a pantograph or a combination of a tenter oven and a linear motor, a rolling method using pressure of rollers, and the like can be used. The biaxially stretched layer is preferably formed by being stretched 15 to 60 times in areal stretch ratio, and is more preferably formed by being stretched 20 to 50 times.

A simultaneous biaxial stretch (inflation) method in which a molten resin is extruded in a tube form by using a circular die connected to a screw-type extruder, and thereafter, air is blown therein, and other methods can be used.

[Roll and Adhesive Tape]

The roll according to the present invention has the film according to the present invention, wherein one direction in the film is the longitudinal direction. The film according to the present invention can be produced continuously, and as required, cut (slit) in a predetermined width and the like, and taken up to thereby make the roll.

The adhesive tape according to the present invention has the film according to the present invention, wherein the film has a pressure-sensitive adhesive layer on at least one surface thereof. The film according to the present invention, since being able to be coated with a pressure-sensitive adhesive, can be pasted as a pressure-sensitive adhesive film on an adherend, and furthermore, the pressure-sensitive adhesive film can be cut by hand after the pasting. The adhesive tape can be made by a method in which a jumbo roll, which is obtained by winding and taking up, on a roll core, an original-width film prepared by coating one surface or both surfaces of the film with a pressure-sensitive adhesive or the like, is cut in a predetermined width, and again taken up on a paper pipe, and the like.

The adhesive tape according to the present invention, since having properties of being able to be cut by hand and being able to be cut linearly in cutting, is suitable for applications to packing tapes, curing tapes, food packages, binding tapes and the like.

From the viewpoint of applications of the adhesive tape, the form of the adhesive tape is preferably designed such that no peeling paper is used by coating one surface of the film with a pressure-sensitive adhesive and by coating the opposite surface of the film with a peeling agent for peeling of the pressure-sensitive adhesive.

In order that cissing is not caused during coating with the pressure-sensitive adhesive or the peeling agent, each surface of the film is preferably subjected to an activation treatment. As the activation treatment, a corona discharge treatment is suitable.

The pressure-sensitive adhesive, the peeling agent and other materials necessary to impart tackiness, and production methods thereof are not particularly limited, and may suitably be selected from well-known materials and methods.

EXAMPLES

Hereinafter, the present invention will be described more specifically by using Examples, Comparative Examples and Test Examples. The following materials, amounts used, proportions, operations and the like can suitably be changed without departing from the spirit of the present invention.

Therefore, the scope of the present invention is not limited to the following specific examples.
<Evaluation Items>
(Basis Weight, Thickness, Density, Mass Occupancy of the Uniaxially Stretched Layer>

A film being a measuring object was punched out into a size of 100 mm×100 mm, and according to JIS P8124: 2011 "Paper and board-Determination of grammage", weighed by an electronic force balance to measure its mass (g), which was then divided by the area (0.01 m$^2$), to thereby determine the basis weight (grammage) ($B_T$, g/m$^2$). Then, the thickness ($T_T$, μm) was measured according to JIS K7130: 1999 by using a constant-pressure thickness meter (trade name: PG-01J, manufactured by Teclock Corp.). Then, by dividing the basis weight ($B_1$, g/m$^2$) by the thickness ($T_T \times 10^{-6}$, m), the density ($\rho_T$, g/cm$^3$) of the whole was determined.

Then, the sample film was nicked between layers with a razor blade (trade name: Proline Blade, manufactured by Schick Japan K.K.), and each layer was peeled by hand with the nicking as a start and taken out. When an obtained layer was an A layer, the mass ($W_A$) and the thickness ($T_A$) were measured as in the above, and the basis weight ($B_A$) and the density ($\rho_A$) were determined therefrom. The other layers were similarly treated.

Then, the mass occupancy (no unit) of the uniaxially stretched layer was determined by dividing the basis weight ($B_1$) of the uniaxially stretched layer by the basis weight ($B_T$) of the sample film. When the sample film had two or more uniaxially stretched layers, the total of basis weights of each uniaxially stretched layer was taken as a basis weight ($B_1$) of the uniaxially stretched layers.

The basis weights, the thicknesses and the densities of each layer and the whole layer, and the mass occupancies of the uniaxially stretched layers are shown in Table 3.
(Tensile Strength, Tensile Strain at Strength)

From a film being a measuring object, 5 or more test sheets of 10 mm in width×80 mm in length in each of MD and CD were prepared. The each test sheet was measured for the tensile strength and the tensile strain at strength when the test sheet was stretched at a test speed of 100 mm/min according to the method of JIS K7161-1, and 5 data in the confidence interval (probability: 95%, see JIS Z9041-2) were collected and averaged to take the average value as a measurement value.

The tensile strength and the tensile strain at strength in MD and those in CD are shown in Table 3.
(Easy Cuttability, Right Angled Tear Resistance)

Test pieces were fabricated from a film being a measuring object such that the tensile direction of the sample pieces became perpendicular to the direction in which the linear cuttability could be obtained in the following test for linear cuttability; sample pieces were subjected to the test according to JIS K7128-3 "Plastic-film and sheeting-Determination of tear resistance-Part 3: Right angled tear method" at a test speed A (200±20 mm/min) for three times; and one sample piece exhibited a highest tear resistance was evaluated according to the following criteria.

A right angled tear resistance of lower than 2.5 N: C . . . being inferior in formability A right angled tear resistance of 2.5 to 4 N: A . . . being excellent in easy cuttability and good in productivity A right angled tear resistance of 4 to 5 N: B . . . practically obtaining easy cuttability A right angled tear resistance exceeding 5 N: C . . . being poor is easy cuttability The evaluation of the easy cuttability and the right angled tear resistance are shown in Table 3.
(Linear Cuttability)

From a film being a measuring object, one strip of 50 mm in width and 200 mm in length in each of MD and CD was cut out. A notch of 10 mm was scored at the center position at 25 mm from both ends on one short side of 50 min of the each sample strip, is parallel with the long sides of 200 mm. Both ends of the notched portion were held by hands and pulled and torn toward directions of 180° with respect to the film surface. Areas of both pieces of the torn sample strip were compared and the tearing direction of a sample strip in which the difference in area between the both torn pieces was smaller was taken as the direction obtaining the linear cuttability. The width of a portion where the width of the torn piece was shortest was measured; the value was taken to be L (mm); and the value represented by the expression (1) was taken as an index of the linear cuttability. When tearing extending from the notch scored on the one side of the sample strip did not reach the other short side, L=0.

$$\text{Linear cuttability} = L \qquad \text{Expression (1)}$$

A linear cuttability of 21 to 25 mm: A . . . being remarkably excellent in the linear cuttability A linear cuttability of 6 to 20 mm: B . . . practically being usable with no problem A linear cuttability of 0 to 5 mm: C . . . practically being unusable The evaluation of the linear cuttability and the numerical value of the linear=cuttability are shown in Table 3.
(Breakability in Processing)

The number of times of breakage per 1,000 m in production of the film and processing of the pressure-sensitive adhesive roll was evaluated according to the following criteria.

Less than 0.01 times: A . . . being producible with no problem

More than 0.01 times or more and less than 0.2 times: B . . . being slightly difficult in production Exceeding 0.2 times: C . . . being difficult in production
(Hand Cuttability of Rolls)

A film was let out from a roll and whether the film was able to be cut by hand is the longitudinal direction (MD) and the transverse direction (CD) of the film was tested for three times, and the hand cuttability was evaluated according to the following criteria.

Being able to be cut by hand two or more times: A being hand cuttable

Not being able to be cut by hand in two or more times: B . . . being insufficient is hand cuttability Not being able to be cut by hand all of three times: C . . . no hand cuttability
(Hand Cuttability of Pressure-Sensitive Adhesive Tapes)

A pressure-sensitive adhesive tape was let out from a pressure-sensitive adhesive roll and whether the tape was able to be cut by hand is the longitudinal direction (MD) and the transverse direction (CD) of the tape was tested for three times, and the hand cuttability was evaluated according to the following criteria.

Being able to be cut by hand two or more times: A . . . being hand cuttable

Not being able to be cut by hand in two or more times: B . . . being insufficient in hand cuttability Not being able to be cut by hand all of three times: C . . . no hand cuttability

MATERIALS AND COMPOSITIONS FOR EACH LAYER USED IS EXAMPLES

Details of materials used for resin compositions of A layer to C layer in the following Examples are indicated in Table 1.

Further, compositions (blending ratio) of the resin compositions of the A layer to the C layer are indicated in Table 2.

TABLE 1

| Kind | Abbreviation | Content |
|---|---|---|
| Thermoplastic Resin | PP1 | propylene homopolymer (trade name: Novatec PP MA4, manufactured by Japan Polypropylene Corporation, MFR (JIS K7210): 5 g/10 min, melt peak temperature (JIS K7121): 167° C.) |
| | PE2 | high-density polyethylene (trade name: Novatec LL LC602A, manufactured by Japan Polyethylene Corporation, MFR (JIS K6922-2): 8.2 g/10 min) |
| Petroleum Resin | PR1 | alicyclic saturated hydrocarbon resin (trade name: Arkon P-140, manufactured by Arakawa Chemical Industries, Ltd., softening point (ring-and-ball method): 140° C.) |
| Inorganic Fine Powder | CA1 | heavy calcium carbonate (trade name: "Softon #1800," manufactured by Bihoku Funka Kogyo Co., Ltd., volume-average particle diameter: 1.8 μm) |
| | CA2 | heavy calcium carbonate (trade name: "Caltex 7," manufactured by Maruo Calcium Co., Ltd., volume-average particle diameter: 0.97 μm) |
| | TIO | rutile-type titanium dioxide (trade name: "Tipaque CR-60," manufactured by Ishihara Sangyo Kaisha Ltd., volume-average particle diameter: 0.2 μm) |

TABLE 2

| | Resin Composition Blending Ratio (parts by mass) | | | | | | | | | | | | | | |
|---|---|---|---|---|---|---|---|---|---|---|---|---|---|---|---|
| | A layer | | | | | B layer | | | | | | C layer | | | | |
| | PP1 | PE1 | CA1 | CA2 | TIO | PP1 | PE1 | PR1 | CA1 | CA2 | TIO | PP1 | PE1 | CA1 | CA2 | TIO |
| Example 1 | 44.5 | — | 55 | — | 0.5 | 74.5 | 5 | — | 20 | — | 0.5 | 44.5 | — | 55 | — | 0.5 |
| Example 2 | 34.5 | — | — | 65 | 0.5 | 54.5 | 5 | — | — | 40 | 0.5 | 34.5 | — | — | 65 | 0.5 |
| Example 3 | 59.5 | — | 40 | — | 0.5 | 79.5 | 5 | — | 15 | — | 0.5 | 59.5 | — | 40 | — | 0.5 |
| Example 4 | 44.5 | — | 55 | — | 05 | 64.5 | 5 | — | 30 | — | 0.5 | — | — | — | — | — |
| Example 5 | 74.5 | — | 25 | — | 0.5 | 59.5 | — | — | 40 | — | 0.5 | 74.5 | — | 25 | — | 0.5 |
| Example 6 | — | 100 | — | — | — | 59.5 | 5 | — | 35 | — | 0.5 | — | 100 | — | — | — |
| Example 7 | 39.5 | — | 60 | — | 0.5 | 59.5 | 5 | — | 35 | — | 0.5 | — | — | — | — | — |
| Example 8 | 65 | — | 34.5 | — | 0.5 | 59.5 | 5 | — | 35 | — | 0.5 | 65 | — | 34.5 | — | 0.5 |
| Example 9 | biaxially stretched polyethylene terephthalate film | | | | | joining layer | | | | | | 69.5 | — | 30 | — | 0.5 |
| Comparative Example 1 | 54.5 | — | 45 | — | 0.5 | 86.5 | 5 | — | 8 | — | 0.5 | 54.5 | — | 45 | — | 0.5 |
| Comparative Example 2 | — | — | — | — | — | 69.5 | — | — | 30 | — | 0.5 | — | — | — | — | — |
| Comparative Example 3 | — | — | — | — | — | 74.5 | 5 | — | 20 | — | 0.5 | — | — | — | — | — |
| Comparative Example 4 | 65 | — | 34.5 | — | 0.5 | 59.5 | — | 40 | — | — | 0.5 | 65 | — | 34.5 | — | 0.5 |

Example 1

(Production of a Film)

74.5 parts by mass of a propylene homopolymer (abbreviation: PP1, trade name: Novatec PP MA4), 5 parts by mass of a high-density polyethylene (abbreviation: PE1, trade name: Novatec LL C602A), 20 parts by mass of a heavy calcium carbonate (abbreviation: CA1, trade name: Softon #1800), and 0.5 parts by mass of a rutile-type titanium dioxide (abbreviation: TIC, trade name: Tipaque CR-60) were mixed, and melt kneaded by an extruder for the B layer set at 250° C. to thereby make a resin composition for the B layer. Thereafter, the resin composition for the B layer was fed to a T die for the B layer set at 250° C. to be extruded in a sheet form, which was cooled by a cooling roller such that the sheet surface temperature became about 60° C. to thereby obtain an unstretched sheet. The obtained unstretched sheet was again heated by a heat roller such that the sheet surface temperature became 140° C., and thereafter stretched 4 times in the longitudinal direction (MD) by utilizing the circumferential speed difference between rollers, and cooled by a cooling roller until the sheet surface temperature became about 60° C. to thereby obtain a 4-times stretched sheet.

Then, 44.5 parts by mass of the above PP1, 55 parts by mass of the above CA1 and 0.5 parts by mass of the above TIO were melt kneaded by an extruder for the A layer set at 230° C., and was fed as a resin composition for the A layer to a T die for the A layer set at 230° C. Separately therefrom, a material in the same blending ratio as the above resin composition for the A layer was melt kneaded by an extruder for the C layer set at 230° C., and was fed as a resin composition for the C layer to a T die for the C layer. Then, each resin composition was extruded in a sheet form from the corresponding T die, and laminated on the above 4-times stretched sheet so as to make an A layer/B layer/C layer, and cooled until the sheet surface temperature became about 60° C. to thereby obtain a laminated sheet having a three-layer structure.

The obtained laminated sheet was again heated such that the sheet surface temperature became 150° C. by using a tenter oven, and thereafter stretched 9 times in the transverse direction (CD) by using a tenter. The resultant was further subjected to an annealing treatment in a heat set zone regulated at 170° C., and cooled by a cooling roller until the sheet surface temperature became about 60° C. Edges of the sheet were slit away to thereby obtain a film having a three-layer structure (A layer: uniaxially stretched/B layer: biaxially stretched/C layer: uniaxially stretched).

(Production of a Roll)

The obtained was dried and taken up by 150 m on a paper pipe to obtain a roll.

(Production of a Pressure-Sensitive Adhesive Tape and a Pressure-Sensitive Adhesive Roll)

Both surfaces of the obtained film were subjected to a corona discharge treatment. Then, a solution in which a long-chain alkyl pendant-based release agent (manufactured by Lion Speciality Chemicals Co., Ltd., trade name: Peeloil 1010) was diluted to a solid content concentration of 10% by mass with toluene was applied to the surface of the A layer side of the film by a gravure roller, and thereafter dried to thereby form a release layer. Regulation was made such that the thickness of the release layer after the drying became 50 nm.

Then, to the surface of the film where no release layer had been provided, a solution in which an acrylic pressure-sensitive adhesive (manufactured by Toyochem Co., Ltd., trade name: Oribain BPS6231) was diluted to a solid content concentration of 45% by mass with toluene was applied by a comma coater to thereby form a pressure-sensitive adhesive layer. Thereafter, the resultant was regulated such that the amount used for coating the pressure-sensitive adhesive layer after being dried became 40 g/m$^2$, and dried, and taken up.

A film was again taken out from the taken-up roll, and slit into a width of 48 mm to thereby obtain a pressure-sensitive adhesive tape. The adhesive tape was taken up by 150 m on a paper pipe having the same width to thereby obtain a pressure-sensitive adhesive roll.

Examples 2 and 3, and Comparative Example 1

Films, rolls and pressure-sensitive adhesive tapes were obtained as in Example 1, except for changing the resin compositions of the A layer to the C layer to blends indicated in Table 1 and Table 2.

Example 4

64.5 parts by mass of a propylene homopolymer (abbreviation: PP1, trade name: Novatec PP MA4), parts by mass of a high-density polyethylene (abbreviation: PE1, trade name: Novatec LL LC602A), 30 parts by mass of a heavy calcium carbonate (abbreviation: CA1, trade name: Softon #1800), and 0.5 parts by mass of a rutile-type titanium dioxide (abbreviation: TIC, trade name: Tipaque CR-60) were mixed, and melt kneaded by an extruder for the B layer set at 250° C. to thereby make a resin composition for the B layer. Thereafter, the resin composition for the B layer was fed to a T die for the B layer set at 250° C. to be extruded in a sheet form, which was cooled by a cooling roller such that the sheet surface temperature became about 60° C. to thereby obtain an unstretched sheet. The obtained unstretched sheet was again heated by a heat roller such that the sheet surface temperature became 140° C., and thereafter stretched 4 times in the longitudinal direction by utilizing the circumferential speed difference between rollers, and cooled by a cooling roller until the sheet surface temperature became about 60° C. to thereby obtain a 4-times stretched sheet.

Then, 44.5 parts by mass of the above PP1, 55 parts by mass of the above CA1 and 0.5 parts by mass of the above TIC were melt, kneaded by an extruder for the A layer set at 230° C., and was fed as a resin composition for the A layer to a T die for the A layer set at 230° C. The resin composition was extruded in a sheet form through the T die set at 230° C., and laminated on the above 4-times stretched sheet so as to make an A layer/B layer to thereby obtain a laminated sheet having a two-layer structure.

The obtained laminated sheet was again heated such that the sheet surface temperature became 150° C. by using a tenter oven, and thereafter stretched 9 times in the transverse direction by using a tenter. The resultant was further subjected to an annealing treatment in a heat set zone regulated at 170° C., and cooled by a cooling roller such that the sheet surface temperature became about 60° C. Edges of the sheet were slit away to thereby obtain a film having a two-layer structure (A layer: uniaxially stretched/B layer: biaxially stretched).

A roll and a pressure-sensitive adhesive tape were obtained as in Example 1, except for using the film obtained in Example 4.

Example 5

74.5 parts by mass of a propylene homopolymer (abbreviation: PP1, trade name: Novatec PP MA4), 25 parts by mass of a heavy calcium carbonate (abbreviation: CA1, trade name: Softon #1800), and 0.5 parts by mass of rutile-type titanium dioxide (abbreviation: TIO, trade name: Tipaque CR-60) were mixed, and melt kneaded by an extruder for the A layer set at 250° C. to thereby make a resin composition for the A layer. Thereafter, the resin composition for the A layer was fed to a T die for the A layer set at 250° C. to be extruded in a sheet form, which was cooled by a cooling roller such that the sheet surface temperature became about 60° C. to thereby obtain an unstretched sheet for the A layer.

The obtained unstretched sheet for the A layer was again heated by a heat roller such that the sheet surface temperature became 145° C., and thereafter stretched 6 times in the longitudinal direction by utilizing the circumferential speed difference between rollers, and cooled by a cooling roller until the sheet surface temperature became about 60° C. to thereby obtain a uniaxially stretched resin film for the A layer.

Separately therefrom, a uniaxially stretched resin film for the C layer was obtained by the same method as in the A layer by using a resin composition for the C layer having the same blending ratio as in the A layer.

59.5 parts by mass of a propylene homopolymer (abbreviation: PP1, trade name: Novatec PP MA4), 40 parts by mass of a heavy calcium carbonate (abbreviation: CA1, trade name: Softon #1800), and 0.5 parts by mass of rutile-type titanium dioxide (abbreviation: TIO, trade name: Tipaque CR-60) were mixed, and melt kneaded by an extruder for the B layer set at 250° C. to thereby make a resin composition for the B layer. Thereafter, the resin composition for the B layer was fed to a T die set at 230° C. to be extruded in a sheet form, which was then interposed between the above uniaxially stretched resin film for the A layer and the above uniaxially stretched resin film for the C layer, and pressure bonded by a roller to be laminated so as to make an A layer/B layer/C layer. This was cooled by a cooling roller such that the temperature of the whole sheet became 60° C.; and edges of the sheet were slit away to thereby obtain a film having a three-layer structure (A layer: uniaxially stretched/B layer: unstretched/C layer: uniaxially stretched).

A roll and a pressure-sensitive adhesive tape were obtained as in Example 1, except for using the film obtained in Example 5.

Example 6

59.5 parts by mass of a propylene homopolymer (abbreviation: PP1, trade name: Novatec PP MA4), 5 parts by mass of a high-density polyethylene (abbreviation: PE1, trade name: Novatec LL LC602A), 35 parts by mass of a heavy calcium carbonate (abbreviation: CA1, trade name: Softon #1800), and 0.5 parts by mass of a rutile-type titanium dioxide (abbreviation: TIO, trade name: Tipaque CR-60) were mixed, and melt kneaded by an extruder for the B layer set at 250° C. to thereby make a resin composition for the B layer. Thereafter, the resin composition for the B layer was fed to a T die for the B layer set at 250° C. to be extruded in a sheet form, which was cooled by a cooling roller such that the sheet surface temperature became about 60° C. to thereby obtain an unstretched sheet.

The obtained unstretched sheet was again heated by a heat roller such that the sheet surface temperature became 145° C., and thereafter stretched 6 times in the longitudinal direction by utilizing the circumferential speed difference between rollers, and cooled by a cooling roller until the sheet surface temperature became about 60° C. to thereby obtain a uniaxially stretched resin sheet for the B layer.

Then, a high-density polyethylene (abbreviation: PE1, trade name: Novatec LL LC602A) was melt kneaded by an extruder for the A layer set at 190° C. to thereby make a resin composition for the A layer. Thereafter, the resin composition for the A layer was extruded in a sheet form through a T die for the A layer set at 200° C., and laminated on one surface of the uniaxially stretched film for the B layer obtained in the above to thereby obtain a laminated stretched resin film having an A layer/B layer.

On the other hand, the above PE1 was melt kneaded by an extruder for the C layer set at 190° C. to thereby make a resin composition for the C layer. Thereafter, the resin composition for the C layer was extruded in a sheet form through a T die for the C layer set at 200° C., and laminated on the B layer surface of the laminated stretched resin film obtained in the above to thereby obtain a laminated resin film having an A layer/B layer/C layer.

The laminated stretched film was cooled by a cooling roller such that the temperature of the whole sheet became 60° C.; and edges of the sheet were slit away to thereby obtain a film having a three-layer structure (A layer: unstretched/B layer: uniaxially stretched/C layer: unstretched).

A roll and a pressure-sensitsive adhesive tape were obtained as in Example 1, except for using the film obtained in. Example 6.

Example 7

A uniaxially stretched resin film for the B layer which had been stretched 6 times as in Example 6 was obtained by using the same resin composition for the B layer as in Example 6.

Then, 39.5 parts by mass of a propylene homopolymer (abbreviation: P91, trade name: Novatec PP MA4), 60 parts by Mass of a heavy calcium carbonate (abbreviation: CA1, trade name: Softon #1800), and 0.5 parts by mass of a rutile-type titanium dioxide (abbreviation: TIC, trade name: Tipaque CR-60) were mixed, and melt kneaded by an extruder for the A layer set at 250° C. to thereby make a resin composition for the A layer. Thereafter, the resin composition for the A layer was fed to a T die for the A layer set at 250° C. to be extruded in a sheet form, which was then laminated on one surface of the uniaxially stretched resin film for the B layer obtained in the above so as to make an A layer/B layer to thereby obtain a laminated resin film.

The obtained laminated resin film was cooled by a cooling roller such that the temperature of the whole sheet became 60° C.; and edges of the sheet were slit away to thereby obtain a film having a two-layer structure (A layer: unstretched/B layer: uniaxially stretched).

A roll and a pressure-sensitive adhesive tape were obtained as in Example 1, except for using the film obtained in Example 7.

Example 8

65.0 parts by mass of a propylene homopolymer (abbreviation: PP1, trade name: Novatec PP MA4), 34.5 parts by mass of a heavy calcium carbonate (abbreviation: CA1, trade name: Softon #1800), and 0.5 parts by mass of a rutile-type titanium dioxide (abbreviation: TIO, trade name: Tipague CR-60) were mixed, and melt kneaded by an extruder for the A layer set at. 250° C. to thereby make a resin composition for the A layer. Thereafter, the resin composition for the A layer was fed to a T die for the A layer set at 250° C. to be extruded in a sheet form, which was then cooled by a cooling roller such that the sheet surface temperature became about 60° C. to thereby obtain a unstretched sheet. The unstretched sheet was again heated by a heat roller such that the sheet surface temperature became 140° C., and thereafter stretched 4 times in the longitudinal direction by utilizing the circumferential speed difference between rollers, and cooled by a cooling roller until the sheet surface temperature became about 60° C. to thereby obtain a 4-times stretched sheet.

Then, the resin composition for the B layer in Example 6 and a resin composition for the C layer having the same blend as in the above A layer were melt kneaded by separate extruders, respectively, and fed to a two-kind two-layer T die. The two resin compositions were extruded in a laminated state through the T die, and laminated on the above 4-times stretched sheet so as to make an A layer/B layer/C layer. The resultant was cooled until the sheet surface temperature became about 60° C. to thereby obtain a laminated sheet having a three-layer structure.

The obtained laminated sheet was again heated such that the sheet surface temperature became 150° C. by using a tenter oven, and thereafter stretched 9 times in the transverse direction by using a tenter. The resultant was further subjected to an annealing treatment in a heat set zone regulated at 170° C., and cooled by a cooling roller such that the sheet surface temperature became about 60° C.; and edges of the sheet were slit away to thereby obtain a film having a three-layer structure (A layer: biaxially stretched/B layer: uniaxially stretched/C layer: uniaxially stretched).

A roll and a pressure-sensitive adhesive tape were obtained as in Example 1, except for using the film obtained in Example 8.

Comparative Example 2

69.5 parts by mass of a propylene homopolymer (abbreviation: PP1, trade name: Novatec PP MA4), 30 parts by mass of a heavy calcium carbonate (abbreviation: CA1, trade name: Softon #1800), and 0.5 parts by mass of a rutile-type titanium dioxide (abbreviation: 110, trade name: Tipaque CR-60) were mixed, and melt kneaded by an extruder for the B layer set at 250° C. to thereby make a resin composition for the B layer. Thereafter, the resin composition for the B layer was fed to a T die for the B layer set at 250° C. to be extruded in a sheet form, which was then cooled by a cooling roller such that the sheet surface temperature became about 60° C. to thereby obtain an unstretched sheet.

The obtained unstretched sheet was again heated such that the sheet surface temperature became 150° C. by using a tenter oven, and thereafter stretched 9 times in the transverse direction by using a tenter. The resultant was further subjected to an annealing treatment in a heat set zone regulated at 170° C., and cooled by a cooling roller such that the sheet surface temperature became about 60° C.; and edges of the sheet were slit away to thereby obtain a uniaxially stretched resin film. Although breakage occurred in the longitudinal direction (MD) in the course of production, the obtained uniaxially stretched resin film was used as a film of Comparative Example 2.

A roll and a pressure-sensitive adhesive tape were obtained as in Example 1, except for using the film obtained in Comparative Example 2.

Example 9

A biaxially stretched polyethylene terephthalate film having hand cuttability in both directions of MD and TD (trade name: Tearfine TF110, manufactured by Toyobo Co., Ltd., basis weight: 18.2 g/m$^2$, thickness: 14 μm, density: 1.3/cm$^3$) and the film of Comparative Example 2 were dry laminated with a two-pack type adhesive for dry lamination (trade name: BLS-PG5/CAT-RT1, manufactured by Toyo-Morton, Ltd., basis weight: 2.1 g/m$^2$) to thereby obtain a laminated resin film having a three-layer structure.

A roll and a pressure-sensitive adhesive tape were obtained as in Example 1, except for using the film obtained in Example 9.

Comparative Example 3

By using the same resin composition for the B layer as in Example 1, a uniaxially stretched resin film for the B layer which had been stretched 4 times was obtained as in Example 1.

The obtained uniaxially stretched resin film was again heated such that the sheet surface temperature became 150° C. by using a tenter oven, and thereafter stretched 9 times in the transverse direction by using a tenter. The resultant was further subjected to an annealing treatment in a heat set zone regulated at 170° C., and cooled by a cooling roller such that the sheet surface temperature became about 60° C.; and edges of the sheet were slit away to thereby obtain a biaxially stretched resin film. The obtained biaxially stretched resin film was used as a film of Comparative Example 3.

A roll and a pressure-sensitive adhesive tape were obtained as in Example 1, except for using the film obtained in Comparative Example 3.

Comparative Example 4

A film having three-layer structure (A layer: biaxially stretched/B layer: uniaxially stretched/C layer: uniaxially stretched), a roll and a pressure-sensitive adhesive tape were obtained as in Example 8, except for changing the resin composition for the B layer in Example 8 to a blend indicated in Table 2.

TABLE 3

| | | | Example 1 | Example 2 | Example 3 | Example 4 | Example 5 | Example 6 | Example 7 |
|---|---|---|---|---|---|---|---|---|---|
| A Layer | Stretch Method | | transverse uniaxial | transverse uniaxial | transverse uniaxial | transverse uniaxial | longitudinal uniaxial | unstretch | unstretch |
| | Basis weight ($B_A$) | g/m$^2$ | 21 | 25 | 28 | 16 | 15 | 10 | 20 |
| | Thickness ($T_A$) | μm | 25 | 42 | 29 | 20 | 20 | 16 | 14 |
| | Density ($\rho_A$) | g/cm$^3$ | 0.84 | 0.60 | 0.97 | 0.8 | 0.75 | 0.63 | 1.43 |
| B Layer | Stretch Method | | biaxial | biaxial | biaxial | biaxial | unstretch | longitudinal uniaxial | longitudinal uniaxial |
| | Basis weight ($B_B$) | g/m$^2$ | 14 | 20 | 5 | 13 | 20 | 25 | 25 |
| | Thickness ($T_B$) | μm | 20 | 25 | 6 | 20 | 14 | 35 | 35 |
| | Density ($\rho_B$) | g/cm$^3$ | 0.7 | 0.8 | 0.83 | 0.65 | 1.43 | 0.71 | 0.71 |
| C Layer | Stretch Method | | transverse uniaxial | transverse uniaxial | transverse uniaxial | — | longitudinal uniaxial | unstretch | — |
| | Basis weight ($B_C$) | g/m$^2$ | 21 | 25 | 28 | — | 15 | 10 | — |
| | Thickness ($T_C$) | μm | 25 | 42 | 29 | — | 20 | 16 | — |
| | Density ($\rho_C$) | g/cm$^3$ | 0.84 | 0.60 | 0.97 | — | 0.75 | 0.63 | — |
| Whole Layer | Basis weight ($B_T$) | g/m$^2$ | 56 | 70 | 61 | 29 | 50 | 45 | 45 |
| | Thickness ($T_T$) | μm | 70 | 109 | 64 | 67 | 54 | 67 | 49 |
| | Density ($\rho_T$) | g/cm$^3$ | 0.80 | 0.64 | 0.95 | 0.43 | 0.93 | 0.67 | 0.92 |
| Mass Occupancy of Uniaxially Stretched Layer | | — | 0.75 | 0.71 | 0.92 | 0.55 | 0.60 | 0.56 | 0.56 |
| MD | Tensile Strength | kN/m | 1.9 | 2.4 | 1.2 | 1.4 | 9.1 | 9.0 | 85 |
| | Tensile strain at strength | % | 96 | 110 | 61 | 99 | 18 | 20 | 15 |
| CD | Tensile Strength | kN/m | 7.4 | 9.1 | 6.7 | 5.4 | 2.4 | 2.2 | 2.0 |
| | Tensile strain at strength | % | 14 | 18 | 17 | 14 | 110 | 148 | 110 |
| Easy Cuttability | | | A | A | A | A | A | B | B |
| Right Angled Tear Resistance | | N | 3.5 | 4.1 | 2.8 | 3.2 | 5.0 | 5.7 | 4.6 |
| Linear Cuttability | | | A | A | A | B | B | B | B |
| Direction in which Linear Cuttability is Attained | | | CD | CD | CD | CD | MD | MD | MD |
| Numerical Value of Linear Cuttability | | mm | 22 | 21 | 24 | 15 | 17 | 8 | 9 |
| Breakability in Processing | | | A | A | B | A | A | A | A |
| Hand Cuttability of Roll | | MD | C | C | C | C | B | B | B |
| | | CD | A | A | A | A | C | C | C |
| Hand Cuttability of Adhesive Tape | | MD | C | C | C | C | B | B | B |
| | | CD | A | A | A | A | C | C | C |

TABLE 3-continued

|  |  |  | Example 8 | Example 9 | Comp. Ex. 1 | Comp. Ex. 2 | Comp. Ex. 3 | Comp. Ex. 4 |
|---|---|---|---|---|---|---|---|---|
| A Layer | Stretch Method |  | biaxial | biaxial | transverse uniaxial | — | — | biaxial |
|  | Basis weight ($B_A$) | g/m² | 3 | 18 | 12 | — | — | 3 |
|  | Thickness ($T_A$) | μm | 5 | 14 | 13 | — | — | 5 |
|  | Density ($\rho_A$) | g/cm³ | 0.60 | 1.30 | 0.92 | — | — | 0.60 |
| B Layer | Stretch Method |  | transverse uniaxial | unstretch | biaxial | transverse uniaxial | biaxial | transverse uniaxial |
|  | Basis weight ($B_B$) | g/m² | 16 | 2 | 23 | 40 | 40 | 19 |
|  | Thickness ($T_B$) | μm | 20 | 1.7 | 30 | 50 | 55 | 20 |
|  | Density ($\rho_B$) | g/cm³ | 0.80 | 1.24 | 0.77 | 0.80 | 0.73 | 0.95 |
| C Layer | Stretch Method |  | transverse uniaxial | transverse uniaxial | transverse uniaxial | — | — | transverse uniaxial |
|  | Basis weight ($B_C$) | g/m² | 4 | 40 | 12 | — | — | 4 |
|  | Thickness ($T_C$) | μm | 5 | 50 | 13 | — | — | 5 |
|  | Density ($\rho_C$) | g/cm³ | 0.80 | 0.80 | 0.92 | — | — | 0.80 |
| Whole Layer | Basis weight ($B_T$) | g/m² | 23 | 60 | 47 | 40 | 45 | 26 |
|  | Thickness ($T_T$) | μm | 30 | 66 | 56 | 50 | 60 | 30 |
|  | Density ($\rho_T$) | g/cm³ | 0.77 | 0.92 | 0.84 | 0.80 | 0.75 | 0.87 |
| Mass Occupancy of Uniaxially Stretched Layer |  | — | 0.84 | 0.66 | 0.51 | 1.00 | 0.00 | 0.86 |
| MD | Tensile Strength | kN/m | 1.3 | 2.2 | 3.8 | 0.8 | 3.5 | 2.5 |
|  | Tensile strain at strength | % | 72 | 60 | 125 | 44 | 155 | 45 |
| CD | Tensile Strength | kN/m | 9.3 | 4.4 | 9.0 | 10.2 | 9.2 | 2.7 |
|  | Tensile strain at strength | % | 19 | 18 | 27 | 29 | 14 | 20 |
| Easy Cuttability |  |  | A | A | C | A | C | B |
| Right Angled Tear Resistance |  | N | 2.6 | 53 | 7.8 | 2.3 | 9.7 | 24 |
| Linear Cuttability |  |  | A | B | C | A | C | C |
| Direction in which Linear Cuttability is Attained |  |  | CD | CD | CD | CD | CD | CD |
| Numerical Value of Linear Cuttability |  | mm | 23 | 7 | 5 | 25 | 0 | 3 |
| Breakability in Processing |  |  | B | A | A | C | A | C |
| Hand Cuttability of Roll | MD |  | C | C | C | C | C | C |
|  | CD |  | A | A | C | B | B | A |
| Hand Cuttability of Adhesive Tape | MD |  | C | C | C | C | C | C |
|  | CD |  | A | A | A | B | B | A |

As is clear from Table 3, the films of Examples 1 to 9, in which the tensile strength in one direction was 1.1 to 2.5 kN/m and the tensile strength in a direction orthogonal to the one direction was 3.0 to 10 kN/m, had easy cuttability and caused no breakage when the rolls were produced from the films.

By contrast, Comparative Example 1 and Comparative Example 3, in which the tensile strength in one direction exceeded 2.5 kN/m, developed no easy cuttability.

Comparative Example 2, in which the tensile strength in one direction was below 1.1 kN/m, sometimes caused breakage in production of the film and production of the roll.

Comparative Example 4, in which the tensile strength in one direction was 1.1 to 2.5 kN/m and the tensile strength in a direction orthogonal to the one direction was below 3.0 kN/m, exhibited no anisotropy and had easy cuttability in both MD and CD and simultaneously exhibited no linear cuttability, making a film not meeting the object of the present invention.

Then, the films of Examples 1 to 9, in which the tensile strain at strength in one direction was 50 to 150% and the tensile strain at strength in a direction orthogonal to the one direction was 8 to 20%, were excellent in the easy cuttability and the linear cuttability, and since no breakage occurred when the rolls were produced from the films, were suppressed in breakability in processing.

By contrast, in Comparative Example 2 and Comparative Example 4, in which the tensile strain at strength in one direction was below 50%, breakage easily occurred when the films were produced or the rolls using the films were produced.

In Comparative Example 1, in which the tensile strain at strength in one direction was 50 to 150%, but the tensile strain at strength in a direction orthogonal to the one direction exceeded 20%, the easy cuttability was inferior and the linear cuttability could hardly be obtained.

In Comparative Example 3, in which the tensile strain at strength in one direction exceeded 150%, the easy cuttability was inferior and the linear cuttability could not be obtained at all.

Comparative Example 4, in which the tensile strain at strength in one direction was below 50% and the tensile strain at strength in a direction orthogonal to the one direction was 8 to 20%, exhibited no anisotropy in the tensile strain at strength and good easy cuttability in both MD and CD, but obtained no linear cuttability at all.

That is, it can be read that the anisotropy in the tensile strain at strength contributed to the easy cuttability and the linear cuttability.

Then, the films of Examples 1 to 7, which had the uniaxially stretched layer containing 30 to 80% by mass of the thermoplastic resin and 20 to 70% by mass of the inorganic fine powder or the organic filler and had a mass occupancy of the uniaxially stretched layer of 0.55 to 0.95, were excellent in the easy cuttability and the linear cuttability and suppressed in breakability in processing.

By contrast, Comparative Example 1 and Comparative Example 3, which had a mass occupancy of the uniaxially stretched layer below 0.55, were inferior in the easy cuttability and could not develop the linear cuttability.

In Comparative Example 2, which had a mass occupancy of the uniaxially stretched layer exceeding 0.95, breakage was liable to occur in production of the film and in production of the roll using the film.

The rolls were made from the films of Examples 1 to 4, in which the direction of a lower tensile strength or the direction of a higher tensile strain at strength, that is, "one direction" in the present invention was MD; then, it was found that the films were taken out from the rolls and could be cut in the width direction of the films by hand as they were. On the other hand, in Examples 5 to 7, in which the above one direction was CD, it was found to be difficult to take out the films from the rolls and cut the films in the width direction by hand as they were. Instead, it was easy to tear up the taken-out films in the longitudinal direction by hand.

As is clear from Table 3, in all the Examples and Comparative Examples, the pressure-sensitive adhesive rolls could be obtained. However, in Comparative Example 2, which had a low tensile strength in MD, the number of times of breakage per 1,000 m exceeded 0.2, which was in a level where the production was difficult. Further when MD was taken as "one direction" (the tensile strength in MD was lower than that in CD, or the tensile strain at strength in MD was higher than that in CD), the hand cuttability of the pressure-sensitive adhesive rolls developed. By contrast, when CD was taken as "one direction," it was difficult to take out the pressure-sensitive adhesive tapes from the pressure-sensitive adhesive rolls and cut the pressure-sensitive adhesive tapes in the width direction by hand as they were, which meant that the hand cuttability of the pressure-sensitive adhesive rolls was not developed.

INDUSTRIAL APPLICABILITY

The film according to the present invention can easily be cut by hand, can be cut linearly in cutting and is unlikely to be broken in processing and is suppressed in breakability in processing. By producing the film such that "one direction" of the present invention is MD (longitudinal direction of the film), the roll of the film of the present invention can easily be cut in CD (in the width direction of the film) by hand. Thereby, easy handling in later processing of the film according to the present invention becomes easy. Further since the film according to the present invention is coated with a pressure-sensitive adhesive and can be made into the pressure-sensitive adhesive roll, there can be produced the pressure-sensitive adhesive roll wherein the film can be cut by hand while the film is let out from the roll.

On the other hand, by producing the film such that "one direction" of the present invention is CD (width direction), the film which can easily be torn by hand can be produced.

REFERENCE SIGNS LIST

1 FILM
2 FIRST LAMINATED LAYER
3 CORE LAYER
4 SECOND LAMINATED LAYER
11 FILM
12 FIRST LAMINATED LAYER
13 CORE LAYER
14 SECOND LAMINATED LAYER

The invention claimed is:

1. A film having a tensile strength in one direction of 1.1 to 2.5 kN/m as measured at a tensile rate of 100 mm/min according to JIS K7161-1,
the film having a tensile strength in a direction orthogonal to the one direction of 3.0 to 10 kN/m as measured at a tensile rate of 100 mm/min according to JIS K7161-1,
the film comprising at least one uniaxially stretched layer and a total mass occupancy of the at least one uniaxially stretched layer is 0.55 to 0.95 as determined by dividing a basis weight of the at least one uniaxially stretched layer by a basis weight of all layers of the film, and
the film having: a core layer, a first laminated layer on one surface of the core layer, and a second laminated layer on another surface of the core layer that is opposite the one surface of the core layer, wherein:
(i) the core layer is an unstretched layer or a biaxially stretched layer, and the first laminated layer and the second laminated layer are the at least one uniaxially stretched layer, or
(ii) the core layer is the at least one uniaxially stretched layer, and the first laminated layer is the biaxially stretched layer or the unstretched layer.

2. The film according to claim 1, wherein
the at least one uniaxially stretched layer comprises 30 to 80% by mass of a thermoplastic resin and 20 to 70% by mass of an inorganic fine powder or an organic filler.

3. A roll, comprising the film according to claim 1, wherein the one direction in the film is a longitudinal direction.

4. A pressure-sensitive adhesive tape, comprising the film according to claim 1, wherein the adhesive tape has a pressure-sensitive adhesive layer on at least one surface of the film.

5. The film according to claim 1, further comprising the first laminated layer and the second laminated layer being the at least one uniaxially stretched layer, and wherein each of the first laminated layer and the second laminated layer has a thickness of 20 to 35 μm.

6. The film according to claim 1, further comprising the first laminated layer and the second laminated layer being the at least one uniaxially stretched layer, and the thickness of the core layer is 10 to 25 μm.

7. The film according to claim 1, further comprising the core layer being the at least one uniaxially stretched layer, and wherein each of the first laminated layer and the second laminated layer has a thicknesses of 5 to 30 μm.

8. The film according to claim 1, further comprising the core layer being the at least one uniaxially stretched layer, and the thickness of the core layer is 15 to 40 μm.

9. A film having a tensile strain at tensile strength in one direction of 50 to 150% as measured at a tensile rate of 100 mm/min according to JIS K7161-1,
the film having a tensile strain at tensile strength in a direction orthogonal to the one direction of 8 to 20% as measured at a tensile rate of 100 mm/min according to JIS K7161-1, and
the film comprising at least one uniaxially stretched layer and a total mass occupancy of the at least one uniaxially stretched layer is 0.55 to 0.95 as determined by dividing a basis weight of the at least one uniaxially stretched layer by a basis weight of all layers of the film, and
the film having: a core layer, a first laminated layer on one surface of the core layer, and a second laminated layer on another surface of the core layer that is opposite the one surface of the core layer, wherein:
(i) the core layer is an unstretched layer or a biaxially stretched layer, and the first laminated layer and the second laminated layer are the at least one uniaxially stretched layer, or (ii) the core layer is the at least one uniaxially stretched layer, and the first laminated layer is the biaxially stretched layer or the unstretched layer.

10. The film according to claim 9, wherein the at least one uniaxially stretched layer comprises 30 to 80% by mass of a thermoplastic resin and 20 to 70% by mass of an inorganic fine powder or an organic filler.

11. A roll, comprising a film according to claim 9, wherein the one direction in the film is a longitudinal direction.

12. A pressure-sensitive adhesive tape, comprising a film according to claim 2, wherein
the adhesive tape has a pressure-sensitive adhesive layer on at least one surface of the film.

13. The film according to claim 9, further comprising the first laminated layer and the second laminated layer being the at least one uniaxially stretched layer, and wherein each of the first laminated layer and the second laminated layer has a thickness of 20 to 35 µm.

14. The film according to claim 9, further comprising the first laminated layer and the second laminated layer being the at least one uniaxially stretched layer, and the thickness of the core layer is 10 to 25 µm.

15. The film according to claim 9, further comprising the core layer being the at least one uniaxially stretched layer, and wherein each of the first laminated layer and the second laminated layer has a thicknesses of 5 to 30 µm.

16. The film according to claim 9, further comprising the core layer being the at least one uniaxially stretched layer, and the thickness of the core layer is 15 to 40 µm.

\* \* \* \* \*